United States Patent Office 3,480,623
Patented Nov. 25, 1969

3,480,623
3-(2'-CHLOROETHYLTHIO)-6-FORMYL-9α-FLUORO-STEROIDS
Alberto Consonni, Ugo Pallini, and Roberto Sciaky, Milan, Italy, assignors to Societá Farmaceutici Italia, Milan, Italy, a corporation of Italy
No Drawing. Filed Dec. 26, 1967, Ser. No. 693,096
Claims priority, application Italy, Dec. 29, 1966, 31,646/66
Int. Cl. C07c *169/36, 173/00, 167/36*
U.S. Cl. 260—239.55     8 Claims

ABSTRACT OF THE DISCLOSURE

Described are 3-(2'-chloroethylthio)-6-formyl-9α-fluorosteroids and a process for their preparation. The compounds display anti-inflammatory activity.

The present invention relates to new steroid derivatives useful in therapy and to the preparation thereof. More particularly, the invention refers to new compounds of the structural formula:

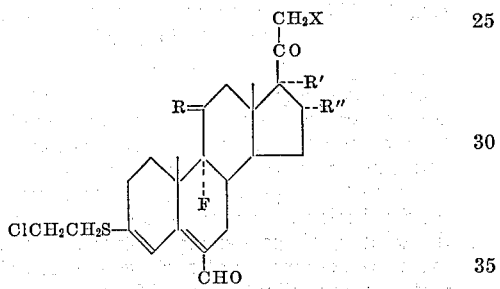

wherein
R is selected from the group consisting of αH(βOH) and O;
R' is αOH;
R'' is selected from the group consisting of H, αOH and αCH$_3$;
R' and R'' may be part of the group

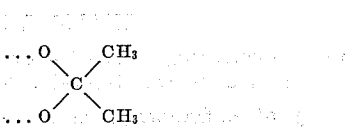

X is selected from the group consisting of H and OY in which
Y is the acyl radical of an organic mono- or dicarboxylic acid having from 1 to 9 carbon atoms
and to the process for their preparation.

The products of the present invention display a good anti-inflammatory activity by topical route and therefore are useful in therapy.

These compounds may be prepared from the corresponding 3-keto-4-pregnenes by reaction with β-chloroethylmercaptan in the presence of an acid catalyst and subsequently formulated according to the following scheme:

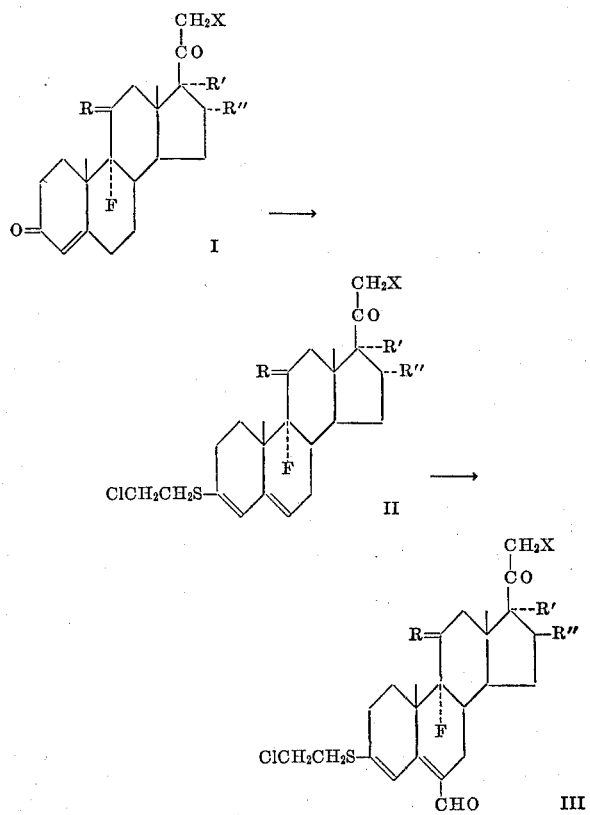

In greater detail the process of the invention comprises reacting the starting 4-keto-4-pregnene (I) with β-chloroethylmercaptan, in a solution of a suitable organic solvent and in the presence of an acid catalyst such as pyridine hydrochloride or sulphate, p-toluenesulphonic or sulphuric acid. The reaction is preferably carried out in anhydrous atmosphere, at the oiling temperature of the solvent used, for a period of from 10 to 30 hours. 3-(2'-chloroethylthio)-3,5-pregnadiene of Formula II is separated from the reaction mixture, according to the known techniques. It is then dissolved in a chlorine-containing organic solvent, such a trichloroethylene, chloroform, dichloroethane, carbon tetrachloride or a formamide. The solution obtained is reacted with a formamide such as a dialkylformamide, e.g., dimethylformamide or methylethylformamide, an alkylarylformamide, e.g. methylphenylformamide, or a cyclic formamide in which the nitrogen atom is a member of a cyclic ring, for example formylpiperidine, and a chlorinating agent, such as phosphorus oxychloride, phosgene, phosphorus pentachloride, thionyl chloride and their analogues. The formamide used may be added directly to the solution of the steroid or in solution in a chlorine-containing organic solvent, preferably one of those mentioned above. Reaction takes place at from 0° to 30° C., preferably at room temperature in from 1 to 5 hours. The reaction mixture obtained is then submitted to mild alkaline hydrolysis, preferably with an aqueous solution of sodium acetate. The products obtained are isolated by extraction with a suitable solvent and further purified, preferably by crystallization or chromatography. If the products obtained according to the process of the invention contain the 21-acyloxy group, they may be transformed into the corresponding 21-hydroxy by alkaline hydrolysis.

Typical products prepared according to the process of the invention are:

3-(2'-chloroethylthio)-6-formyl-9α-fluoro-3,5-pregnadien-11β,17α,21-triol-20-one-21-acetate, 3-(2'-chloroethylthio)-6-formyl-9α-fluoro-3,5-pregnadien-17α,21-diol-11,20-dione-21-acetate 3-(2'-chloroethylthio)-6-formyl-9α-fluoro-3,5-pregnadien-11β,16α,17α,21-tetrol-20-one-16,17-acetonide-21-acetate, 3-(2'-chloroethylthio)-6-formyl-9α-fluoro-3,5-pregnadien-11β,17α,21-triol-20-one-21-hexanoate, 11β,17α,21-triol-20-one-21-acetate, 3-(2'-chloroethylthio)-6-formyl-9α-fluoro-3,5-pregnadien-11β,16α,17α-triol-20-one-16,17-acetonide, and 3-(2'-chloroethylthio)-6-formyl-9α-fluoro-16α-methyl-3,5-pregnadien-11β,17α,21-triol-20-one-21-acetate.

Typical products of the invention are other 21-acyl derivatives, in which the acyl is the radical of a carboxylic organic acid having from 1 to 9 carbon atoms, particularly the 21-propionate, 21-butyrate, 21-valerate, 21-caproate, 21-octanoate, 21-hemisuccinate, 21-cyclopentylpropionate.

The products of the invention display a good anti-inflammatory activity and particularly show a dissociation between the local and systemic anti-inflammatory activity without showing undesired side effects, which normally appear in the products administered by systemic route.

The anti-inflammatory activity of the products of the invention has been determined according to the method described by Robert, A., et al. (Acta Endocrinol, 25, 1957, pp. 105–112) on groups of albino rats of 8–10 animals each group. Administrations are effected by (1) Local route (Selye pouch) only once,
(2) Local route daily, and
(3) Oral route daily.

In the following table, the values of the effective dose ($ED_{50}$), that is the dose, expressed in μg., which inhibits 50% of the inflammatory exudate in respect to the non-treated controls, are reported with comparison to dexamethasone.

TABLE

| Compounds | $ED_{50}$ Once local route, μg. | $ED_{50}$ Daily local route, μg./day | $ED_{50}$ Daily oral route, μg./day |
|---|---|---|---|
| Dexamethasone | 184 | 0.56 | 4.24 |
| 3-(2'-chloroethylthio)-6-formyl-9α-fluoro-3,5-pregnadien-17α, 21-diol-11, 20-dione-21-acetate | 30 | 0.6 | >100 |
| 3-(2'-chloroethylthio)-6-formyl-9α-fluoro-3,5-pregnadien-11β, 17α, 21-triol-20-one-21-acetate | 19 | 0.39 | >30 |
| 3-(2'-chloroethylthio)-6-formyl-9α-fluoro-3,5-pregnadien-11β, 16α, 17α, 21-tetrol-20-one-16,17-acetonide-21-acetate | 10 | 0.5 | >300 |

The clinical indications are preferably: skin diseases, eczema, psoriasis, urticaria, allergic syndromes, rheumatic arthritis, articular rheumatism, uratic arthritis, nephrosic syndromes, conjunctivitis, ophthalmia, synovitis, and shock states.

The compounds of the invention may be administered by local or topical route. The therapeutic compositions comprise one or more of the compounds of the present invention with a certain quantity of pharmaceutically acceptable liquid or solid vehicle. The compositions may be prepared as powders, salves, ointments, solutions or emulsions or others usually employed for this purpose.

Excipients may be employed among which the most suitable are starch, lactose, talc, magnesium stearate and their analogues.

EXAMPLE 1

3 - (2' - chloroethylthio) - 6 - formyl - 9α - fluoro - 3,5-pregnadien-11β,17α,21-triol-20-one-21-acetate 1 g. of 9α-fluoro-4-pregnen-11β,17α,21-triol-3,20-dione-21-acetate were dissolved in 30 cc. of anhydrous benzene. 0.5 cc. of β-chloroethylmercaptan, 75 mg. of pyridine hydrochloride, 1.3 cc. of anhydrous ethanol were added to the boiling solution. The reaction mixture was refluxed for 20 hours and the water formed during the reaction was removed by Marcusson's apparatus. The reaction mixture was cooled, mixed with 1 cc. of pyridine, washed with water, dried on anhydrous sodium sulphate and evaporated to dryness. The 1.1 g. residue which consists of crude 3-(2'-chloroethylthio)-9α-fluoro-3,5-pregnadien-11β,17α,21-triol-20-one-21-acetate (U.V. adsorption at 268 mμ) was dissolved in 5 cc. of dimethylformamide and 3 cc. of chloroform and added to the reagent prepared by reacting 2 cc. of dimethylformamide in 2 cc. of chloroform with 1 cc. of phosphorus oxychloride for 30 minutes at room temperature. The reaction mixture was stirred at room temperature for three hours, cooled on ice, mixed with 2 g. of sodium acetate, and diluted with water. The steroid was extracted with ethyl acetate. The extracts were washed with a 5% sodium bicarbonate solution, with water until neutrality, dried on anhydrous sodium sulphate and evaporated to dryness. The residue obtained, crystallized from acetone/ether/petroleum ether, yielded 250 mg. of 3-(2'-chloroethylthio) - 6 - formyl - 9α - fluoro - 3,5 - pregnadien-11β,17α,21-triol-20-one-21-acetate, melted at 227–232° C.;

$\lambda_{max.}^{C_2H_5OH}$ 243 and 338 mμ; ε=9,000 and 15,400; $[\alpha]_D = -7°$ (c.=1% in dioxane)

200 mg. of 3-(2'-chloroethylthio)-6-formyl-9α-fluoro-fluoro - 3,5 - pregnadien - 11β,17α,21 - triol - 20 - one - 21-acetate were suspended in 10 cc. of methyl alcohol and 5 cc. of chloroform in nitrogen atmosphere. 50 mg. of potassium hydroxide dissolved in 1 cc. of water were added to the suspension. The reaction mixture was stirred for 7 minutes at room temperature. During this time, the solution of the starting product and precipitation of the corresponding 21-alcohol were obtained. The mixture was neutralized with 0.05 cc. of acetic acid, concentrated to a small volume and diluted with water. The precipitated product was filtered, washed with water and dried in an oven. 100 mg. of 3-(2'-chloro-ethylthio)-6-formyl-9α-fluoro-3,5-pregnadien-11β,17α,21-triol - 20 - one were obtained. The product, upon crystallization from acetone, melted at 241–242° C.;

$\lambda_{max.}^{C_2H_5OH}$ 244, 339 mμ; ε=10,550 and 18,800; $[\alpha]_D = -50.5°$ (c.=1% in dioxane)

EXAMPLE 2

3 - (2' - chloroethylthio) - 6 - formyl - 9α - fluoro - 3,5-pregnadien-17α,21-diol-11,20-dione-21-acetate 1 g. of 9α-fluorocortisone-21-acetate was dissolved in 20 cc. of anhydrous benzene. The solution was refluxed and the water formed during the reaction was removed with Marcusson's apparatus. 0.5 cc. of β-chloroethylmercaptan, 75 mg. of pyridine hydrochloride and 1.3 cc. of anhydrous ethyl alcohol were then added. The reaction mixture was refluxed for 20 hours, cooled at room temperature and, after addition of 1 cc. of pyridine, was washed with water, dried over anhydrous sodium sulphate and evaporated to dryness. 1.1 g. of a residue was obtained having an U.V. absorption at 268 mμ, and consisted of crude 3-(2'-chloroethylthio)-9α-fluoro-3,5-pregnadien-17α,21-diol - 11,20 - dione - 21 - acetate. This product was dissolved in 5 cc. of dimethylformamide and added to the reagent prepared by reacting for 30 minutes at room temperature 2 cc. of dimethylformamide in 2.5 cc. of trichloroethylene with 1 cc. of phosphorus oxychloride.

The reaction mixture was reacted for 3 hours at room temperature, cooled, added to 2 cc. of pyridine and then diluted with 100 cc. of a 30% solution of sodium acetate. The product obtained was extracted with ethyl acetate. The extracts were washed with a solution of 5% sodium bicarbonate, with water until neutrality, dried over anhydrous sodium sulphate and evaporated to dryness. The residue was dissolved in chloroform and chromatographed on a Florisil column and eluted with chloroform. The eluate was dried and the residue crystallized from acetone/ether/petroleum ether yielded 150 mg. of 3-(2'-chloroethylthio)-6-formyl - 9α-fluoro-3,5 - pregnadien-17α,21-diol-11,20-dione-21-acetate, melting at 227–230° C.;

$\lambda_{max.}^{C_2H_5OH}$ 242 and 336 m$\mu$; $\epsilon = 11,900$ and $18,200$; $[\alpha]_D = -26°$ (c.$=1\%$ in $CHCl_3$)

EXAMPLE 3

3-(2' - chloroethylthio)-6 - formyl-9α - fluoro-3,5-pregnadien - 11β,16α,21 - tetrol-20 - one - 16,17 - acetonide-21-acetate 1 g. of 9α-fluoro-4-pregnen-11β,16α,17α,21-tetrol-3,20-dione-16,17-acetonide-21-acetate were suspended in 30 cc. of anhydrous benzene. The mixture was refluxed and the last traces of moisture were removed with the Marcusson's apparatus. 0.5 cc. of β-chloroethylmercaptan, 1.3 cc. of anhydrous ethyl alcohol and 100 mg. of pyridine hydrochloride were added and refluxed for 20 hours. After this time, the solution was cooled and 1 cc. of pyridine was added. The mixture was then diluted with ethyl acetate, washed with water, dried over anhydrous sodium sulphate and evaporated to dryness. 1.1 g. of crude 3-(2'-chloroethylthio) - 9α - fluoro - 3,5-pregnadien - 11β,16α,17α,21-tetrol-20-one-16,17-acetonide-21-acetate (U.V. absorption at 270 m$\mu$) was obtained. The latter was dissolved in 5 cc. of dimethylformamide and 5 cc. of chloroform and reacted with the reagent prepared from 2 cc. of dimethylformamide in 2 cc. of chloroform and 1 cc. of phosphorus oxychloride. The reaction mixture was stirred for four hours at room temperature, cooled on an ice bath, mixed with 2 g. of sodium acetate, diluted with water. The product obtained was extracted with ethyl acetate. The extracts were washed with a solution of 5% sodium bicarbonate, with water to neutrality, dried over anhydrous sodium sulphate and evaporated to dryness. The residue obtained was dissolved in benzene and chromatographed over Florisil. From the fractions eluted with benzene/ethyl ether (95:5) an oil was obtained which crystallized from acetone/ether/petroleum ether yielded 520 mg. of 3-(2'-chloroethylthio)-6-formyl-9α-fluoro-3,5-pregnadien - 11β,16α,17α,21 - tetrol-20-one-16,17-acetonide-21-acetate, melting at 205–207° C.;

$\lambda_{max.}^{C_2H_5OH}$ 244 and 339 m$\mu$; $\epsilon = 9,000$ and $18,350$; $[\alpha]_D = -7.5°$ (c.$=1\%$ in $CHCl_3$)

EXAMPLE 4

3-(2'-chloroethylthio)-6-formyl-9α-fluoro-3,5 -pregnadien-11β,17α,21-triol-20-one-21-hexanoate To a boiling solution of 1 g. of 9α-fluoro-4-pregnen-11β, 17α,21-triol-3,20-dione-21-hexanoate 0.5 cc. of β-chloroethylmercaptan, 75 mg. of pyridine hydrochloride and 1.3 cc. of anhydrous ethanol were added. The reaction mixture was refluxed for 20 hours and the water formed in the reaction was removed with the Marcusson's apparatus. The mixture was cooled, added to 1 cc. of pyridine, washed with water, dried on anhydrous sodium sulphate, and evaporated to dryness. The residue consisting of crude 3-(2'-chloroethylthio)-9α-fluoro - 3,5-pregnadien-11β,17α, 21-triol-20-one-21-hexanoate, having an U.V. adsorption at 268 m$\mu$, was dissolved in 5 cc. of dimethylformamide and 3 cc. of chloroform and added to the reagent obtained by reacting 2 cc. of dimethylformamide in 2 cc. of chloroform with 1 cc. of phosphorus oxychloride for 30 minutes at room temperature.

The reaction mixture was stirred at room temperature for three hours, cooled on an ice bath, then added to 2 g. of sodium acetate and diluted with water. The steroid was extracted with ethyl acetate. The extracts were washed with a 5% solution of sodium bicarbonate, with water until neutrality, dried on anhydrous sodium sulphate, and evaporated to dryness. The residue obtained was dissolved in benzene and chromatographed over Florisil. From the fractions eluted with benzene/ethyl ether (95:5) 3-(2'-chloroethylthio)-6-formyl-9α-fluoro-3,5-pregnadien-11β,17α,21-triol-20-one-21-hexanoate was isolated. Upon recrystallization from ether/petroleum ether the product melted at 85–90° C.;

$\lambda_{max.}^{C_2H_5OH}$ 245 and 338 m$\mu$; $\epsilon = 8,040$ and $17,200$; $[\alpha]_D = -6°$ (c.$=1\%$ in chloroform)

We claim:
1. A process for preparing steroids having the following formula:

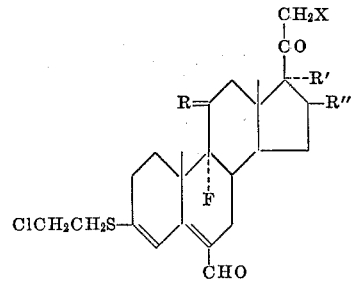

wherein
R is selected from the group consisting of αH(βOH) and O;
R' is αOH,
R'' is selected from the group consisting of H, αOH and αCH$_3$,
R' and R'' may be part of the group

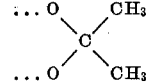

X is selected from the group consisting of H and OY, and
Y is the acyl radical of organic mono and dicarboxylic acids having from 1 to 9 carbon atoms which comprises reacting the corresponding 3-keto-4-pregnene of the formula:

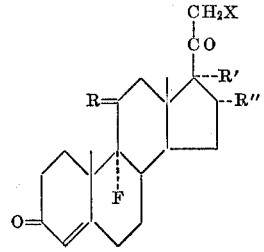

wherein R, R', R'' and X have the above meaning, with β-chloroethylmercaptan in a suitable organic solvent and in the presence of pyridine hydrochloride at the boiling temperature of the solvent, dissolving the resulting 3-(2'-chloroethylthio)-3,5-pregnadiene in an organic solvent, and reacting said 3-(2'-chloroethylthio)-3,5-pregnadiene with a formamide of the group consisting of a dialkyl formamide, an alkylarylformamide and a cyclic formamide in which the nitrogen atom is a member of a cyclic ring and a chlorinating agent selected from the group consisting of phosphorus oxychloride, phosgene, phosphorus pentachloride and thionyl chloride at the temperature of from 0° to 30° C., and separating the resulting product after mild alkaline hydrolysis of the reaction mixture.

2. A compound of the formula

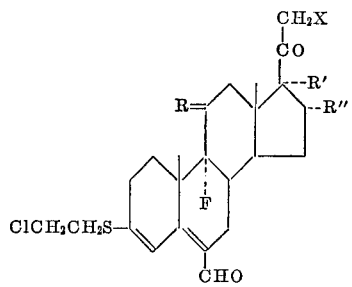

wherein
R is selected from the group consisting of $\alpha H(\beta OH)$ and O;
R' is $\alpha OH$,
R" is selected from the group consisting of H, $\alpha OH$ and $\alpha CH_3$,
R' and R" may be part of the group

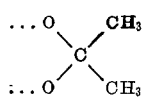

X is selected from the group consisting of H and OY, and

Y is the acyl radical of organic mono or dicarboxylic acids having from 1 to 9 carbon atoms.

3. The product of claim 2, which is 3-(2'-chloroethylthio) - 6 - formyl - 9α-fluoro-3,5-pregnadien-11β,17α,21-triol-20-one-21-acetate.

4. The product of claim 2, which is 3(2'-chloroethylthio) - 6 - formyl - 9α-fluoro-3,5-pregnadien-17α,21-diol-11,20-dione-21-acetate.

5. The product of claim 2, which is 3-(2'-chloroethylthio) - 6-formyl-9α-fluoro-3,5-pregnadien-11β,16α,17α,21-tetrol-20-one-16,17-acetonide-21-acetate.

6. The product of claim 2, which is 3-(2'-chloroethylthio) - 6 - formyl - 9α-fluoro-3,5-pregnadien-11β,17α,21-triol-20-one-21-hexanoate.

7. The product of claim 2, which is 3-(2'-chloroethylthio) - 6 - formyl-9α-fluoro-3,5-pregnadien-11β,16α,17α-triol-20-one-16,17-acetonide.

8. The product of claim 2, which is 3-(2'-chloroethylthio) - 6 - formyl-9α-fluoro-16α-methyl-3,5-pregnadien-11β,17α,21-triol-20-one-21-acetate.

References Cited

UNITED STATES PATENTS 3,364,236   1/1968   Schoenewaldt et al.

HENRY A. FRENCH, Primary Examiner

U.S. Cl. X.R.

260—397.45, 999